Nov. 5, 1940.    D. F. RITCHIE    2,220,495
PRESSURE GAUGE FOR PNEUMATIC TIRES
Filed March 17, 1939
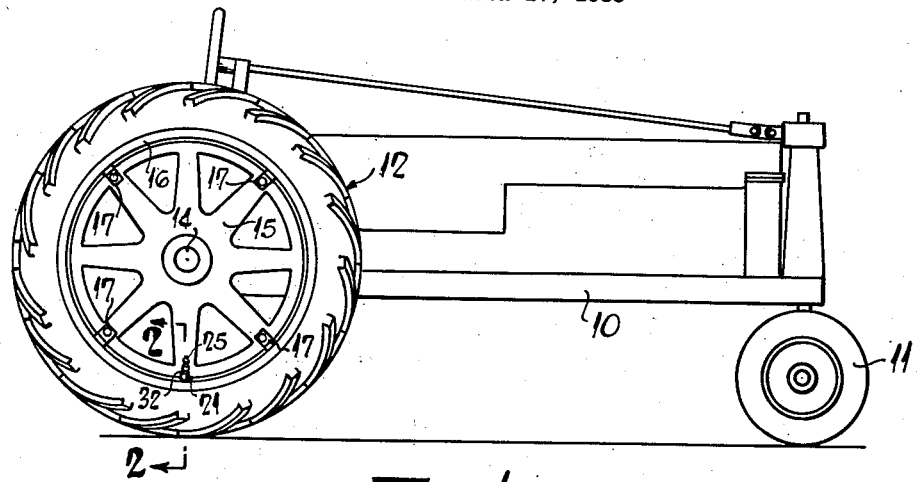
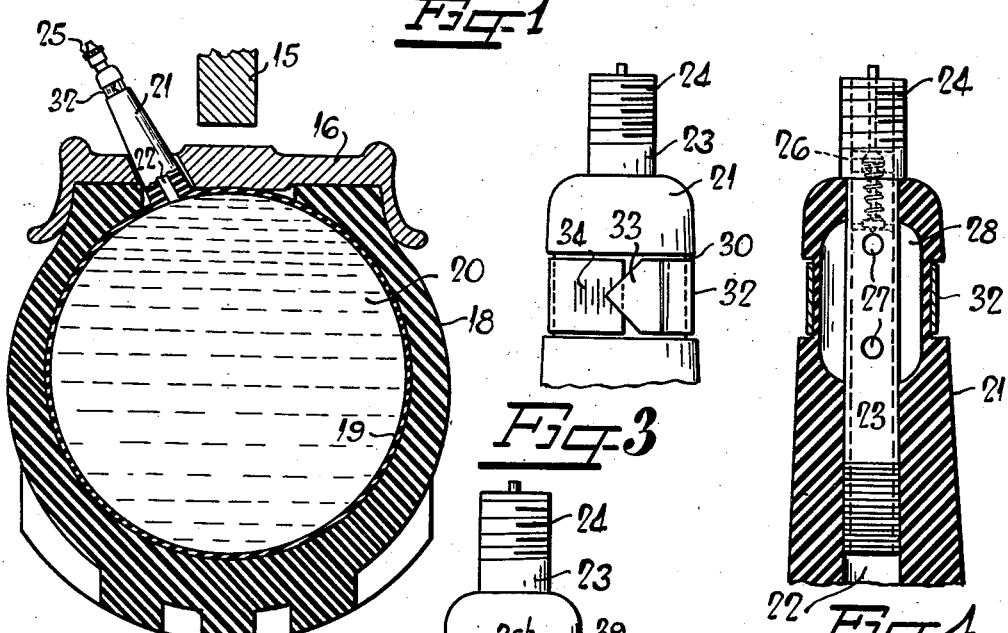
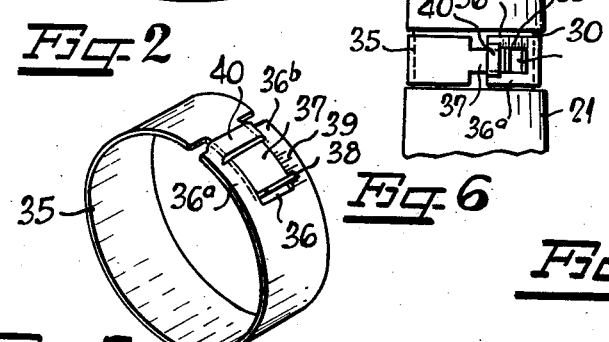
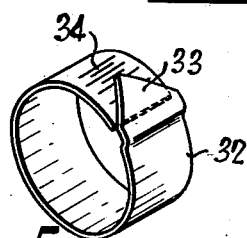
Inventor:
DANIEL F. RITCHIE
By
Attorney Patented Nov. 5, 1940

2,220,495

UNITED STATES PATENT OFFICE 2,220,495

PRESSURE GAUGE FOR PNEUMATIC TIRES

Daniel F. Ritchie, China Grove, N. C.

Application March 17, 1939, Serial No. 262,469

3 Claims. (Cl. 73—31)

This invention relates to a pressure indicating means for pneumatic tires and more especially to an article of this class which is adapted to be associated with tires on tractors, trucks, automobiles and the like.

Tractor tires are filled approximately 80 per cent as conditions warrant with an anti-freeze liquid which serves as a ballast or weight to improve traction. Calcium chloride solution is usually used because of its cheapness as an antifreeze. There are other solutions used as conditions warrant, but such solutions must not be detrimental to the rubber; on the contrary it should be a preserver if possible. Calcium chloride serves this latter purpose as well as the former. Such a solution, however, is very corrosive to ferrous metals, especially when exposed to the atmosphere. Therefore, it has been impossible to use conventional metallic gauges on tires which had this solution therein. Even if the conventional gauge is made of materials unaffected by the solution within the tire, after a time calcium chloride crystals will form inside the mechanism, rendering the gauge inaccurate or inoperative altogether.

It is, therefore, an object of this invention to provide a pressure indicating means in combination with a pneumatic tire, comprising an air chamber disposed in the valve stem, said air chamber having its sidewalls constructed of a suitable elastic material and a ring having overlapping end portions freely movable relative to each other, disposed around the exterior of the sidewalls of said chamber which is capable of expanding or contracting to indicate the amount of pressure within the tire.

The indicating device consists of an expansible and contractible gauge ring having overlapping end portions freely movable relative to each other of suitable material fitted around an air chamber within the stem so as to expand and contract in a plane substantially normal to the longitudinal center line of the valve stem, depending upon the pressure which is present within the stem. The pressure differences between the inside and the outside of the tire will cause a difference in the dimension of the chamber thereby causing the ring to contract or expand accordingly. The stem prevents expansion of the chamber along the longitudinal axis thus confining such expansion to a plane approximately normal to the stem.

The invention can be used on any pneumatic tire, such as trucks, passenger vehicles and the like, whereby the pressure in the tires can be determined by a glance at each tire.

Some of the objects of the invention having been stated, other objects will appear as the description proceeds when taken in connection with the accompanying drawing, in which—

Figure 1 is an elevation of a tractor having tires equipped with the invention;

Figure 2 is a sectional view taken along the line 2—2 in Figure 1;

Figure 3 is an elevation of a valve stem equipped with the improved gauge ring;

Figure 4 is an enlarged sectional view through the valve stem shown in Figures 2 and 3;

Figure 5 is an isometric view of a detached gauge ring which is used for indicating the pressure within the tire;

Figure 6 is an elevation of a valve stem showing a slightly modified form of gauge ring attached thereto;

Figure 7 is an isometric view of the gauge ring used in the form of the invention shown in Figure 6.

Referring more specifically to the drawing, the numeral 10 denotes a tractor having front wheels 11 and rear wheels 12, said rear wheels being mounted upon axle 14. This axle has a disk 15 to which is secured rim 16 by any suitable means such as lugs 17. Mounted around this rim is tire casing 18 which has disposed therein an inner tube 19. In order to provide the necessary weight within the rear wheels, this inner tube is usually filled about 80 per cent full with a suitable antifreeze liquid 20 such as calcium chloride.

The rubber tube 19 has a stem 21 also of rubber which extends through the rim 16, said tube having a bore 22 in the central portion thereof. Secured within the bore 22 by any suitable means such as vulcanizing or by heat binding, is a tube 23. This tube has a threaded portion 24 on its upper end for accommodating a valve cap 25. Disposed within the tube 24 is a conventional valve 26 and this valve normally prevents the escape of air from the inner tube 19. The tube 23 also has an opening or plurality of perforations 27 disposed in the intermediate portion thereof which form passageways between the interior of the tube and a surrounding air chamber 28. This chamber 28 is formed on the interior of the stem 21, therefore, it is seen that the same pressure will be present within the interior of the chamber as is present within the interior of the inner tube 19.

The exterior of the stem 21 has a peripheral groove 30 therein which groove surrounds the chamber 28 and results in a weakened wall surrounding a portion of the air chamber. Disposed within the groove is an expansible and contractible ring 32 having overlapping end portions which are freely movable relative to each other. One of the end portions is provided with a pointer 33 and the other of said end portions is provided with suitable calibrations 34 over which the pointer is adapted to move. When this ring is disposed within the groove 30 and around the chamber 28, the pressure within the chamber will cause the tube to expand, thereby causing the ring to also expand and designate the pressure within the tire. Of course, it is to be understood that the sidewalls of chamber 28 must be made of some suitable elastic material, such as rubber, which is capable of expanding and contracting and transmitting the pressure within the chamber to the surrounding ring 32.

Figures 6 and 7 show a slightly modified form of the invention in which the groove 30 is provided with another type of gauge ring 35, said ring likewise having its end portions overlapping each other. One of the end portions of this ring has a slot 36 cut therein, leaving prongs 36a and 36b. Projection 37 on the other end portion is adapted to slide in the slot, and this projection has an upturned flange 38 integral therewith which is adapted to move past a graduated scale 39 on fork 36b to indicate the amount of expansion and contraction that takes place within the stem 21. The ends of prongs 36a and 36b are joined together by stamped bridge 40. This bridge 40 acts as a stop, against which the upstanding projection 38 will rest when the pressure has reached a predetermined high point, and will prevent excessive pressure from straining or distorting or rupturing of the mechanism. After the pressure has reached such a point, then there is no way of indicating the amount of pressure within the tire by this apparatus.

This gauge ring is described as one of many combinations which may be employed to accomplish the same original purpose of this part. The gauge rings 35 and 32 are intended to be the part of the mechanism to indicate the difference in pressure between the atmosphere and that in the tire; to also act, if desired, as a means of preventing an excess of pressure beyond its range, distorting or rupturing the gauge.

The cross-sectional shape of gauge ring 32 as shown in Figure 4 may be round, square, flat or in any shape whatever as conditions of application warrant and in such cases the groove 30 may be altered to suit.

It is also intended, if conditions warrant, to be able to change the gauge ring for one of greater or lesser expansibility and contractibility to effect a corresponding difference in pressure range.

As previously stated the tube 23 is secured inside of stem 21 by heat binding or the like. It will be noted that the method of securing is used above and below the chamber 23. Therefore, it is impossible for the chamber to expand longitudinally of the stem or tube thereby insuring that expansion can only take place in an outward direction substantially normal to the center line of the tube.

It is therefore seen that I have provided a simple and effective means for indicating the pressure present within a tire at all times. This is particularly attractive due to the fact that it can be manufactured very cheaply and can be made to operate efficiently even when corrosive ballast liquid is used within the tire.

In the drawing and specification, there has been set forth a preferred embodiment of the invention and although specific terms are employed, they are used in a generic and descriptive sense only and not for purposes of limitation, the scope of the invention being set forth in the appended claims.

I claim:

1. An inner tube for pneumatic casings provided with a hollow rubber stem having its interior in communication with the interior of the tube, said stem having a radially expansible and contractible portion responsive to air pressure contained therein, an expansible and contractible ring fitting around the expansible and contractible portion of the stem and having overlapping end portions provided with a scale on one end portion and a marking on the other end portion, the overlapping end portions being freely movable relative to each other so that the relative position of the marking on one end portion to the scale on the other end portion will indicate the amount of air pressure within the stem and the inner tube.

2. In an expansible and contractible rubber pneumatic tube for a tire casing having a hollow expansible and contractible stem associated therewith and communicating with the interior of the tube, a valve in said stem, said stem having a portion of its sidewall of thinner material than the other portions of the stem, whereby the thinner portion will more readily expand and contact in accordance with the internal pressure within the tube and stem, an expansible and contractible member encircling the weakened portion and having its ends disposed in overlapping relation to each other and freely movable relative to each other, whereby the expansible and contractible member will contract and expand in accordance with variations in the internal air pressure within the tube to thereby cause the relative positions of the overlapping ends to indicate the air pressure in the tube.

3. In a rubber inner tube for pneumatic tires, an expansible and contractible rubber stem integral therewith, an expansible and contractible member having overlapping ends freely movable relative to each other and surrounding the stem and responsive to the air pressure within the tube and stem to cause the relative position of the overlapping ends to indicate the air pressure within the tube and stem.

DANIEL F. RITCHIE.